United States Patent [19]

Thompson et al.

[11] Patent Number: 4,770,521

[45] Date of Patent: Sep. 13, 1988

[54] COOLED MIRROR SUBSTRATE ISOLATOR

[75] Inventors: Charles C. Thompson, Jupiter; James R. Bolch, North Palm Beach, both of Fla.

[73] Assignee: United Technologies Corporation, Hartford, Conn.

[21] Appl. No.: 915,582

[22] Filed: Oct. 3, 1986

[51] Int. Cl.<sup>4</sup> ............................ G02B 5/08; G02B 7/18
[52] U.S. Cl. ................................................... 350/610
[58] Field of Search ................ 350/610, 609, 607, 611

[56] References Cited

U.S. PATENT DOCUMENTS

| | | | |
|---|---|---|---|
| 4,443,059 | 4/1984 | Wells | 350/610 |
| 4,606,620 | 8/1986 | Nagano | 350/610 |
| 4,657,359 | 4/1987 | Thompson et al. | 350/610 |

Primary Examiner—Jon W. Henry
Attorney, Agent, or Firm—Dominic J. Chiantera

[57] ABSTRACT

A cooled laser mirror (10) with mirror surface (12), forced-convective cooling heat exchanger (14), and substrate (18), includes a monolithic substrate isolator (50) of porous isotropic material having transpiration flow paths (74) therethrough for providing transpiration cooling of the isolator.

16 Claims, 3 Drawing Sheets

COOLED MIRROR SUBSTRATE ISOLATOR

CROSS REFERENCE TO RELATED APPLICATIONS

Some of the subject matter disclosed herein is also disclosed in a copending patent application of common assignee herewith, entitled: A TRANSPIRATIONALLY COOLED LASER MIRROR, filed by J. Bolch and C. Thompson on Apr. 22, 1986, U.S. Ser. No. 854,634.

DESCRIPTION

1. Technical Field

This invention relates to cooled laser mirrors, and more particularly to heat exchangers used in cooled laser mirrors.

2. Background Art

Cooled laser mirrors include three basic parts: a mirror surface, a heat exchanger, and a substrate. The heat exchanger is placed between the mirror surface and substrate, and provides cooling of the mirror to control thermal loading of the surface. If uncooled, the mirror would experience an unacceptable degree of mirror distortion.

The heat exchanger includes a primary stage heat exchanger mounted in contact with the mirror surface, and a substrate isolator stage mounted between the primary heat exchanger and the substrate. The primary heat exchanger removes heat absorbed by the mirror, as near as possible to the optical surface itself. Typically the primary heat exchanger uses forced convection cooling. Ideally it is dimensionally thin, and uses low fluid coolant pumping power per unit of cooled mirror surface. It must limit its own thermal growth to a level which does not contribute to optical distortion.

The substrate isolator (sometimes referred to as the secondary stage heat exchanger) prevents the heat extracted by the primary heat exchanger from flowing to the substrate. The substrate provides a stable reference for the mirror surface. It incorporates a relatively high stiffness construction to resist physical distortion due to thermal growth of the primary heat exchanger. Due to its massive structure the substrate responds slowly to temperature changes, and these changes can produce mirror distortions which do not stabilize within the laser operating time. The lowest mirror distortion results when the primary heat exchanger is perfectly isolated from the substrate.

Prior art cooled mirrors include forced convection-cooled substrate isolators which, in reality, function as a second stage of the primary heat exchanger. Often they are not distinguished as an element separate from the primary stage. There are three drawbacks to these forced convectioncooled substrate isolators. First, they use large coolant flow rates which can exceed those of the primary exchanger. Secondly, the thickness of the combined primary and secondary stage heat exchanger required to effectively isolate the substrate may produce significant mirror distortions when the secondary heat exchanger temperature increases. Thirdly, the non-zero temperature profile of the coolant flow through the second stage heat exchanger is impressed on to the substrate because of the large heat transfer coefficients present in the high velocity coolant flow. This temperature profile can result in large substrate distortions.

DISCLOSURE OF INVENTION

The object of the present invention is to provide an improved cooled laser mirror assembly having a higher degree of substrate thermal isolation, and therefore reduced distortions.

According to the present invention, an improved cooled laser mirror includes a substrate with fluid conduits for passing liquid coolant therethrough, a mirror assembly, a heat exchanger bonded to the mirror assembly and circulating liquid coolant therethrough to provide forced convection-cooling of the mirror, and a substrate isolator bonded between the heat exchanger and substrate and having fluid conduits therein for exchanging liquid coolant between the substrate and the heat exchanger, the substrate isolator comprising porous isotropic material having transpiration flow paths therein in a direction opposite to the direction of heat flow therein from the heat exchanger, whereby a portion of liquid coolant flows through the isolator flow paths to provide transpiration cooling of the isolator so as to minimize thermal loading thereof.

The cooled laser mirror of the present invention provides maximum thermal isolation of the substrate from the heat exchanger. By using an isolator having transpiration cooling as opposed to forced convection cooling as used in the second stage heat exchangers of the prior art cooled mirror assemblies, the heat leakage is more effectively blocked. As a result of better substrate isolation, total mirror distortion is reduced.

These and other objects, features and advantages of the present invention will become more apparent in light of the following description of a best mode embodiment thereof, as illustrated in the accompanying Drawing.

BEST MODE FOR CARRYING THE INVENTION

Figure 1:
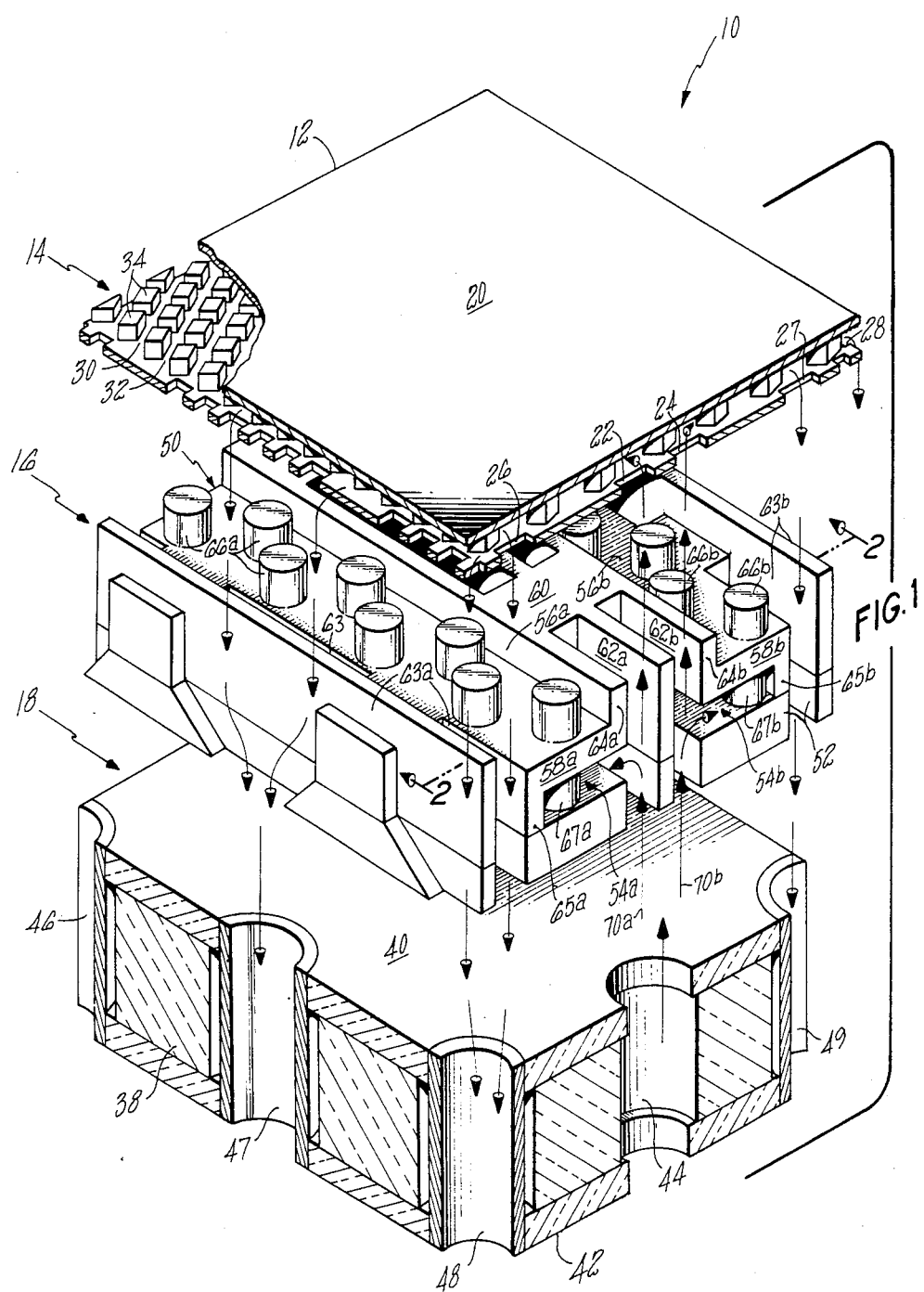
FIG. 1 is an exploded, perspective view of a portion of a laser cooled mirror according to the present invention, shown partly broken away and partly in section.

FIG. 1 is an exploded, perspective view of a portion of a laser cooled mirror assembly 10 according to the present invention. The assembly has four major components which are bonded together; preferably by transient liquid phase (TLP®) bonding. The segments include: a mirror surface 12, a primary heat exchanger 14, a substrate isolator 16, and a substrate assembly 18. In FIG. 1 the illustrated mirror surface 12, the heat exchanger 14, the substrate isolator 16, and substrate 18 are portions (shown in cross section) of the complete mirror surface, heat exchanger, and substrate elements. This is done to facilitate detail illustration of the composite assembly.

In the best mode embodiment, the mirror has a high reflectivity optical surface 20, comprising a silver coating with an aluminum oxide overcoat, or a multilayer stack of quarterwave dielectric layers. The heat exchanger 14 is a forced convection zone-cooled heat exchanger having inlet ports 22, 24 and fluid output ports 26, 28. It includes a plurality of fluid flow paths 30, 32 arranged between pylons 34. In assembly, the pylons are in thermal contact with the mirror surface (not shown) so as to conduct heat from the mirror surface. Liquid coolant, such as water or liquid ammonia, is forced into the heat exchanger through the inlet ports 22, 24. It flows through the paths 30, 32, convecting heat from the pylons, and the heated fluid is discharged through outlet ports 26, 28.

The illustrated substrate assembly 18 includes a solid substrate material 38 enclosed between a top plate 40 and a bottom plate 42. Fluid inlet ports, such as inlet port 44, and discharge ports 46–49, conduct liquid coolant to and from the substrate isolator and heat exchanger stages. Insulating sleeves with ends bonded only to the top plate 40 and bottom plate 42 are located in the discharge ports 46–49 to further isolate the substrate from the heated fluid returning from the heat exchanger and the isolator.

It should be understood that in the present cooled mirror assembly the mirror surface 12, heat exchanger 14, and substrate 18 are not limited to the illustrated embodiments. Any one of a number of alternative embodiments may be used for each, as deemed suitable by those skilled in the art.

The point of novelty in the improved cooled laser mirror of the present invention, is the substrate isolator assembly 16. The isolator uses transpirational cooling to block the flow of heat from the heat exchanger 14 into the substrate 18. The assembly includes a monolithic isolator 50 fabricated from a suitable porous material, and isolator closure plate 52 fabricated from a suitable solid material. The isolator's monolithic structure is divided into flow zones, two of which are illustrated in the Figure. Each zone has a lower plenum 54a, 54b, an upper plenum 56a, 56b, and a spacer 58a, 58b; none of which are necessarily illustrated with dimensional accuracy. The two zones shown are symmetrical about a central ridge, or beam 60 which includes coolant inlet ducts 62a, 62b for channeling the pumped liquid coolant from the substrate inlet ports (44) to the heat exchanger and to each of the zone lower plenums 54a, 54b. Discharge ducts 63a, 63b return the heated coolant from the heat exchanger and the upper plenums to the substrate discharge ports 46–49.

The spacers 58a, 58b each include integral upper plenum dams 64a, 64b and integral lower plenum dams 65a, 65b. The upper dams block direct coolant flow from the ducts 62a, 62b into the upper plenums. The lower dams prevent the heat exchanger return coolant in discharge ducts 63a, 63b from flowing into the lower plenums. Posts 66a, 66b and 67a, 67b in the upper and lower plenums, respectively, are formed in the monolithic isolator structure 50 to structurally support the heat exchanger stage 14 and the closure plate 52. The illustrated staggered arrangement of the posts is discretionary. Any pattern for positioning the posts which provides suitable support may be used.

A portion of the coolant pumped through the inlet ducts 62a, 62b, approximately 30%, is forced into the lower plenums 54a, 54b. This coolant transpires through the spacers 58a, 58b and the upper plenum posts 66a and 66b to reach the upper plenums, thereby providing transpiration cooling of the isolator. To provide transpiration flow paths through the structure the monolithic isolator comprises porous isotropic material; preferably porous silicon carbide available from SOHIO Chemicals and Industrial Products Company. Alternative preferred materials include porous molybdenum, and porous aluminum.

In general any material that can be fabricated in a porous form, that has adequate structural integrity to withstand coolant pressure induced loads, and that can be bonded to the heat exchanger and substrate, may be used. Alternately, small diameter, closely-spaced holes can be formed in solid spacer plates 58a and 58b to create fluid flow paths with transpirational cooling characteristics equivalent to those present in the porous spacer plate design described above. The isolator closure plate 52 comprises a non-porous version of the monolithic isolator material.

Figure 2:
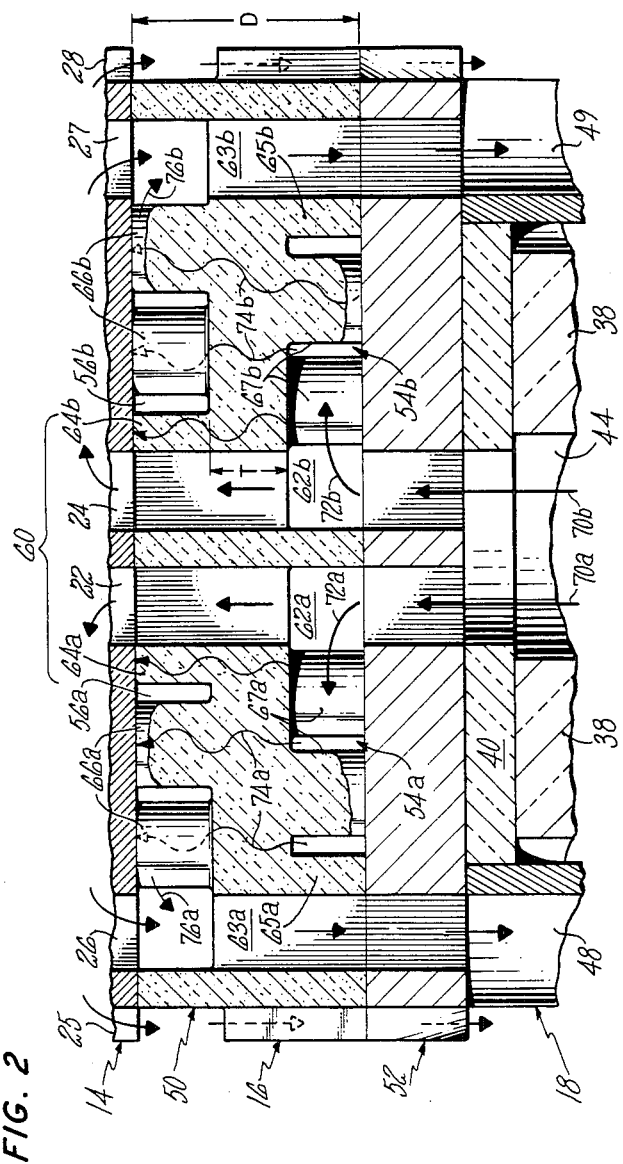
FIG. 2 is an illustration of a section taken along the line 2—2 of FIG. 1.

FIG. 2 illustrates a portion of the isolator assembly 16, taken along the line 2—2 of FIG. 1. Common reference numerals are used for common elements and, as in FIG. 1, the illustrated elements are not necessarily dimensionally correct. As shown, pumped coolant 70a, 70b from the substrate port 44 flows through the isolator inlet ducts 62a, 62b to the heat exchanger, and to each of the zone lower plenums 54a, 54b. The upper plenum dams 64a, 64b prevent direct coolant flow into the upper plenums. The coolant flow 72a, 72b into the lower plenums transpires along flow paths 74a, 74b through the spacers and upper support posts into the upper plenums.

The transpiration flow direction in each spacer is normal to the mirror surface (20, FIG. 1) and opposite to the path of heat leakage from the heat exchanger. Because the coolant flow direction is opposite to that of the direction of the heat leakage, there is maximum utilization of the coolant heat capacity. As the coolant collects in the upper plenums it flows parallel to the mirror surface, and its temperature rises as it absorbs heat from the heat exchanger. The heated coolant 76a, 76b exits the plenum at discharge ducts 63a, 63b and mixes with the coolant discharge from the heat exchanger.

The actual transpiration flow rate is determined by the isolator material porosity, the spacer thickness (T), and the pressure difference between the upper and lower plenums. Typically, for a cooled laser mirror assembly having: a 9.0 square centimeter mirror surface, a coolant pressure of 200 psi at a flow rate of 20 gallons/minute, and an isolator of porous silicon carbide with a spacer thickness (T) of 0.100 inches (0.254 cm) and a top to bottom dimension (D) of 0.200 inches (0.508 cm), the transpiration flow rate is on the order of $\frac{1}{4}$ to $\frac{1}{3}$ (5 to 7 gallons) of the pumped flow rate.

In the present cooled laser mirror assembly the substrate isolator experiences a near constant temperature due to the transpiration cooling. The high conductance of the porous material, which is made possible by the large internal surface areas provided by the pores, results in near identical isolator and coolant temperatures; even in the presence of high heat fluxes. An additional benefit that results when the porous material is adjacent to a flowing coolant (i.e. upper plenum cross flows 76a, 76b) is a reduction in convective heat transfer because of mass injection. The transpired flow injected into the freestream alters the wall boundary layer and can lower film coefficients by almost an order of magnitude over solid wall values.

Figure 3:
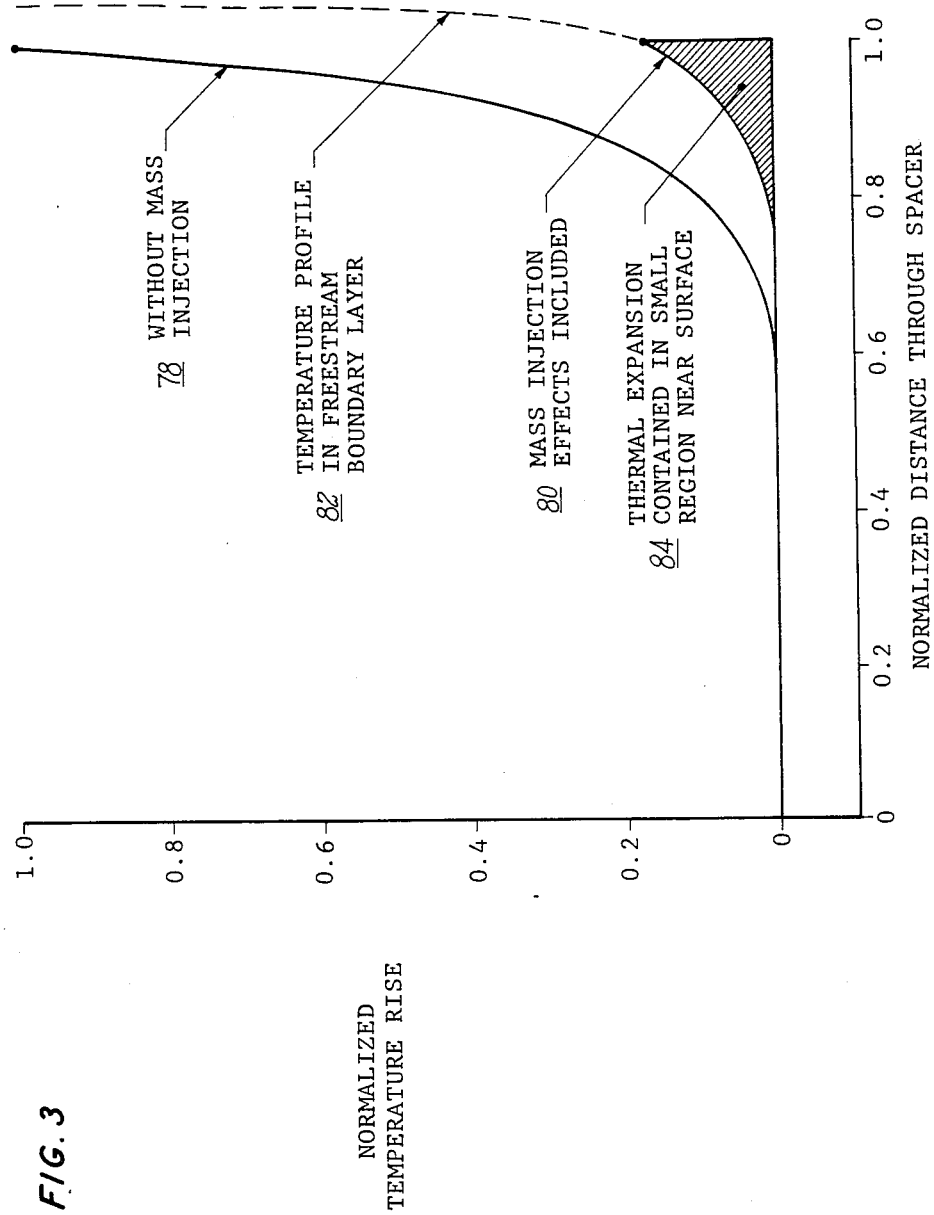
FIG. 3 is a rectangular coordinate plot of the thermal cooling characteristic of the cooled laser mirror embodiment of FIG. 1.

FIG. 3, a plot of the isolator's normalized temperature rise versus the normalized transpiration flow path distance through the spacer, ilustrates how the transpiration flow process, with wall injection, can limit wall temperatures well below those of the freestream. Curve 78 shows the temperature rise characteristic without mass injection. The area under the curve 78 represents thermal distortion (temperature rise times heated thickness) of the isolator. The curve 80 is the temperature rise characteristic with mass injection brought about by transpiration cooling. The dashed curve 82 shows the temperature rise in the boundary layer of the return coolant flow, which does not contribute to isolator heating. The area 84 under the curve 80 represents the minimal amount of heating which occurs in the isolator structure itself. As a result, mirror distortions induced by the porous, transpiration cooled substrate isolator is near non-existent.

The cooled laser mirror of the present invention, with the transpiration cooled porous substrate isolator, offers a significant improvement over laser mirrors with forced convection secondary stage heat exchangers. These improvements are in better substrate isolation, and lower optical distortion. The transpiration cooled isolator can provide a two to three times reduction in total mirror distortion by forcing all heat removal to occur in the primary heat exchanger.

Although the invention has been shown and described with respect to a best mode embodiment thereof, it should be understood by those skilled in the art, that various other changes, additions, and deletions may be made therein without departing from the spirit and scope of the invention.

We claim:

1. A cooled laser mirror assembly for use with a pumped source of liquid coolant, comprising:
   mirror means;
   substrate means, having a substrate major surface, and having fluid inlet ports for transporting liquid coolant from the pumped source to said substrate major surface and fluid discharge ports for transporting liquid coolant from said substrate major surface to the pumped source;
   heat exchanger means, having a mirror mounting surface bonded to said mirror means and having a heat exchanger major surface adapted to receive liquid coolant from said inlet ports, and to circulate the liquid coolant through said heat exchanger means to said discharge ports, to provide forced-convection cooling of said mirror means; as characterized by:
   substrate isolator means, mounted along first and second mounting surfaces thereof to said heat exchanger major surface and to said substrate major surface, respectively, said isolator means including inlet ducts for transporting liquid coolant from said inlet ports to said heat exchanger major surface, and including discharge ducts for transporting liquid coolant from said heat exchanger major surface to said discharge ports, said isolator comprising porous isotropic material having transpiration flow paths disposed therethrough between said inlet ducts and said discharge ducts, in a direction opposite to the direction of heat flow therein from said heat exchanger, whereby a portion of the liquid coolant from said inlet duct transpires through said flow paths to provide transpiration cooling of said isolator, thereby preventing heat flow from said heat exchanger to said substrate.

2. The cooled laser mirror of claim 1, wherein said porous isotropic material comprises porous silicon carbide.

3. The cooled laser mirror of claim 1, wherein said porous isotropic material comprises porous molybdenum.

4. The cooled laser mirror of claim 1, wherein said porous isotropic material comprises porous aluminum.

5. The cooled laser mirror of claim 1, wherein said porous material is fabricated from small-diameter, closely-spaced holes formed in a solid material.

6. The cooled laser mirror of claim 1, wherein said substrate isolator means is bonded along said first and second mounting surfaces to said heat exchanger major surface and to said substrate major surface, respectively.

7. The cooled laser mirror of claim 6, wherein said substrate isolator means is bonded along said first and second mounting surfaces by transient liquid phase bonding.

8. The cooled laser mirror of claim 1, wherein said porous isotropic material comprises a monolithic structure having an upper plenum in proximity to said heat exchanger major surface, and having a lower plenum separated from said upper plenum by spacer means, said spacer means including said transpiration flow paths therein, said lower plenum being in fluid communication with said inlet ducts and said upper plenum being in fluid communication with said discharge ducts, whereby liquid coolant from said lower plenum transpires through said spacer to said upper plenum for return therefrom to said discharge ducts.

9. The cooled laser mirror of claim 8, wherein said spacer means further includes an upper dam and a lower dam, said upper dam forming one wall of said upper plenum for preventing flow thereto of liquid coolant from said inlet duct, said lower dam forming one wall of said lower plenum for preventing flow thereto of liquid coolant from said discharge duct.

10. The laser mirror of claim 8, wherein: said isolator means further comprises closure plate means, having an outer major surface comprising said second mounting surface, and having an inner surface; and wherein
   said monolithic structure further comprises upper and lower mounting posts formed on opposite sides of said spacer means in said upper plenum and said lower plenum, respectively, an end surface of said upper mounting posts comprising said first mounting surface, an end surface of said lower mounting posts being bonded to said inner surface of said closure plate means.

11. The laser mirror of claim 8, wherein said monolithic structure comprises porous silicon carbide.

12. The laser mirror of claim 8, wherein said monolithic structure comprises porous molybdenum.

13. The laser mirror of claim 8, wherein said monolithic structure comprises porous aluminum.

14. The laser mirror of claim 8, wherein said monolithic structure comprises a solid material with small-diameter, closely-spaced holes formed only in the spacer means to form the required transpiration flow path.

15. The laser cooled mirror of claim 10, wherein said closure plate means comprises a non-porous material.

16. The laser cooled mirror of claim 10, wherein said end surfaces of said lower posts are transient liquid phase bonded to said inner surface of said closure plate means.

* * * * *